(12) United States Patent
Tuttle

(10) Patent No.: US 10,071,610 B2
(45) Date of Patent: Sep. 11, 2018

(54) SYSTEM AND METHOD FOR IMPROVED RIDE CONTROL FOR A WORK VEHICLE WHEN TRANSPORTING A DRAWN IMPLEMENT

(71) Applicant: CNH Industrial America, LLC, New Holland, PA (US)

(72) Inventor: Thomas B. Tuttle, Ellison Bay, WI (US)

(73) Assignee: CNH Industrial America LLC, New Holland, PA (US)

( * ) Notice: Subject to any disclaimer, the term of this patent is extended or adjusted under 35 U.S.C. 154(b) by 285 days.

(21) Appl. No.: 14/927,664

(22) Filed: Oct. 30, 2015

(65) Prior Publication Data
US 2017/0120709 A1   May 4, 2017

(51) Int. Cl.
*B60G 17/016*   (2006.01)
*A01B 59/042*   (2006.01)
(Continued)

(52) U.S. Cl.
CPC ............ *B60G 17/016* (2013.01); *A01B 59/00* (2013.01); *A01B 59/002* (2013.01);
(Continued)

(58) Field of Classification Search
CPC ..... A01B 59/042; A01B 59/00; A01B 59/002; A01B 76/00; B60G 17/016;
(Continued)

(56) References Cited

U.S. PATENT DOCUMENTS

| 4,319,766 A | 3/1982 | Corteg et al. |
| 4,640,368 A | 2/1987 | Kittle et al. |

(Continued)

FOREIGN PATENT DOCUMENTS

| EP | 0589688 | 9/1993 |
| WO | WO 91/02226 | 2/1991 |

OTHER PUBLICATIONS

European Search Report for European Application No. 16195683.4 dated May 3, 2017 (4 pages).
(Continued)

*Primary Examiner* — Mussa A Shaawat
(74) *Attorney, Agent, or Firm* — Rickard K. DeMille; Rebecca L. Henkel

(57) ABSTRACT

A method for providing improved ride control for a work vehicle when transporting a drawn implement may include monitoring a load applied through a drawbar-related component(s) of the work vehicle while the drawn implement is being transported, wherein the drawn implement is located at a transport position relative to a driving surface of the work vehicle such that a ground engaging tool of the drawn implement is located above the driving surface. The method may also include detecting a variation in the monitored load over time, comparing the detected load variation in the monitored load to a predetermined load variance threshold and controlling an operation of at least one of an implement suspension system of the drawn implement or a vehicle suspension system of the work vehicle so as to reduce the detected load variation in the monitored load when the load variation exceeds the predetermined load variance threshold.

17 Claims, 7 Drawing Sheets

(51) Int. Cl.
  *A01B 76/00*  (2006.01)
  *A01B 59/00*  (2006.01)
  *B60D 1/24*  (2006.01)

(52) U.S. Cl.
  CPC ............ *A01B 59/042* (2013.01); *A01B 76/00* (2013.01); *B60D 1/247* (2013.01); *B60G 2300/082* (2013.01); *B60G 2400/60* (2013.01); *B60G 2500/10* (2013.01); *B60G 2600/182* (2013.01); *B60Y 2200/221* (2013.01); *B60Y 2400/86* (2013.01)

(58) Field of Classification Search
  CPC .......... B60G 2600/182; B60G 2500/10; B60G 2300/082; B60G 2400/60; B60Y 2200/221; B60Y 2400/86; B60D 1/247
  See application file for complete search history.

(56) References Cited

U.S. PATENT DOCUMENTS

| | | | |
|---|---|---|---|
| 5,441,293 A | 8/1995 | Sturgess | |
| 5,988,000 A | 11/1999 | Adams | |
| 6,053,521 A | 4/2000 | Schertler | |
| 6,119,786 A | 9/2000 | Creger et al. | |
| 6,168,369 B1 * | 1/2001 | Bright | E02F 3/3604 37/405 |
| 6,227,304 B1 * | 5/2001 | Schlegel | A01B 59/064 172/439 |
| 6,234,508 B1 * | 5/2001 | Tuttle | A01B 59/004 280/406.1 |
| 7,104,340 B1 | 9/2006 | Thompson et al. | |
| 7,438,368 B2 | 10/2008 | Kohler et al. | |
| 7,540,524 B2 | 6/2009 | Viaud | |
| 7,721,813 B2 | 5/2010 | Hou | |
| 7,954,556 B2 | 6/2011 | Hou et al. | |
| 7,984,816 B2 | 7/2011 | Ragsdale | |
| 8,162,070 B2 | 4/2012 | Smith et al. | |
| 8,347,529 B2 | 1/2013 | Berg et al. | |
| 8,414,010 B2 | 4/2013 | Smith | |
| 8,496,068 B1 | 7/2013 | Kosmicki et al. | |
| 8,561,472 B2 | 10/2013 | Sauder et al. | |
| 8,700,270 B2 | 4/2014 | Foster et al. | |
| 2002/0125056 A1 * | 9/2002 | Woods | B60G 3/18 180/233 |
| 2005/0006946 A1 | 1/2005 | Traechtler et al. | |
| 2008/0257569 A1 | 10/2008 | Foster et al. | |
| 2012/0024081 A1 | 2/2012 | Baker | |
| 2013/0079980 A1 | 3/2013 | Vuk | |

OTHER PUBLICATIONS

A Portable Instrumentation System for Measuring Draft and Speed N.P. Thomson and K.J. Shinners. 1989 American Cancer Society Agricultural Engineers, Jun. 1989 vol. 5(2). (5 pages).

Design and Performance of an Adjustable Three-Point Hitch Dynamometer H.F. Al-Jalil, A. Khdair and W. Mukahal Soil and Tillage Research, vol. 62, Issues 3-4, Nov. 2001 (2 pages).

A Novel Three-Point Hitch Dynamometer to Measure the Draft Requirement of Mounted Implements M. Askari, M.H. Komarizade, A.M. Nikbakht, N. Nobakht, and R.F. Telmourlou., Research Gate Publication, (2 pages).

Integral Drawbar Dynamometer Canadian Agricultural Engineering, vol. 27, No. 2. Fall of 1985. (5 pages).

\* cited by examiner

SYSTEM AND METHOD FOR IMPROVED RIDE CONTROL FOR A WORK VEHICLE WHEN TRANSPORTING A DRAWN IMPLEMENT

FIELD OF THE INVENTION

The present subject matter relates generally to work vehicles and, more particularly, to a system and method for providing improved ride control for a work vehicle when transporting a trailed or drawn implement.

BACKGROUND OF THE INVENTION

One of the most common uses of work vehicles, such as agricultural tractors, is to move implements through agricultural fields to cultivate and condition the soil. Implements are commonly connected for towing by tractors using a three-point hitch or a drawbar. For "drawn" implements towed using a drawbar, the implement typically includes one or more actuators that allow the implement to be raised and lowered relative to the ground. As a result, when it is desired to cultivate or condition a field, the implement may be lowered relative to the ground to a lowered or ground-engaging position to allow ground-engaging tools of the implement (e.g., planters, plows, discs, rakes, harrows and/or the like) to dig into or otherwise engage the ground. Similarly, when cultivation is complete, the implement may be raised relative to the ground to a raised or transport position at which the ground-engaging tools are positioned above the ground to allow the implement to be transported. This often occurs when the work vehicle is transporting the implement along a roadway at increased vehicle speeds.

When a drawn implement is being transported in its transport position, a variable load is often applied to the work vehicle by the implement that can significantly impact the driving performance of the vehicle and/or the comfort level for the operator. For example, when the work vehicle is traveling along a bumpy or uneven road at high vehicle speeds, the implement may vibrate or swing up and down relative to the vehicle, which results in a variable load being transmitted to the vehicle from the implement that can negatively impact the vehicle's driving performance and/or the smoothness of the ride provided to the operator.

Accordingly, a system and method for providing improved ride control for a work vehicle when transporting a drawn implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for providing improved ride control for a work vehicle when transporting a drawn implement. The method may include monitoring a load applied on at least one drawbar-related component of the work vehicle while the drawn implement is being transported by the work vehicle, wherein the drawn implement is located at a transport position relative to a driving surface of the work vehicle such that a ground engaging tool of the drawn implement is located above the driving surface. The method may also include detecting a variation in the monitored load over time, comparing the detected load variation in the monitored load to a predetermined load variance threshold and controlling an operation of at least one of an implement suspension system of the drawn implement or a vehicle suspension system of the work vehicle so as to reduce the detected load variation in the monitored load when the load variation exceeds the predetermined load variance threshold.

In another aspect, the present subject matter is directed to a system for providing improved ride control for a work vehicle when transporting a drawn implement, wherein the drawn implement is located at a transport position relative to a driving surface of the work vehicle such that a ground engaging tool of the drawn implement is located above the driving surface. The system may generally include at least one drawbar-related component extending between the work vehicle and the drawn implement and at least one sensor provided in operative association with the drawbar-related component(s) so as to detect a load applied on the drawbar-related component(s). The system may also include a controller communicatively coupled to the sensor(s) and one or more components of the implement. The controller may include a processor and associated memory. The memory may store instructions that, when executed by the processor, configure the controller to monitor the load applied on the drawbar-related component(s) while the drawn implement is being transported by the work vehicle, detect a variation in the monitored load over time, compare the detected load variation in the monitored load to a predetermined load variance threshold and control an operation of at least one of an implement suspension system of the drawn implement or a vehicle suspension system of the work vehicle so as to reduce the detected load variation in the monitored load when the load variation exceeds the predetermined load variance threshold.

In a further aspect, the present subject matter is directed to a work vehicle. The vehicle may include a chassis and a vehicle suspension system configured to raise and lower a front axle of the work vehicle relative to the chassis. The vehicle may also include a drawn implement having a ground engaging tool and an implement suspension system. The drawn implement may be configured to be located at a transport position relative to a driving surface of the work vehicle when the drawn implement is being transported by the work vehicle such that the ground engaging tool is located above the driving surface. The implement suspension system may be configured to raise and lower the ground engaging tool relative to the driving surface in addition, the vehicle may include at least one drawbar-related component extending between the chassis and the drawn implement and at least one sensor provided in operative association with the drawbar-related component(s) so as to detect a load applied on the drawbar-related component(s). Moreover, the vehicle may include a controller communicatively coupled to the sensor(s) and one or more components of the implement. The controller may include a processor and associated memory. The memory may store instructions that, when executed by the processor, configure the controller to monitor the load applied through the drawbar-related component(s) while the drawn implement is being transported by the work vehicle, detect a variation in the monitored load over time, compare the detected load variation in the monitored load to a predetermined load variance threshold and control an operation of at least one of the implement suspension system or the vehicle suspension system so as to reduce the detected load variation in the monitored load when the load variation exceeds the predetermined load variance threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
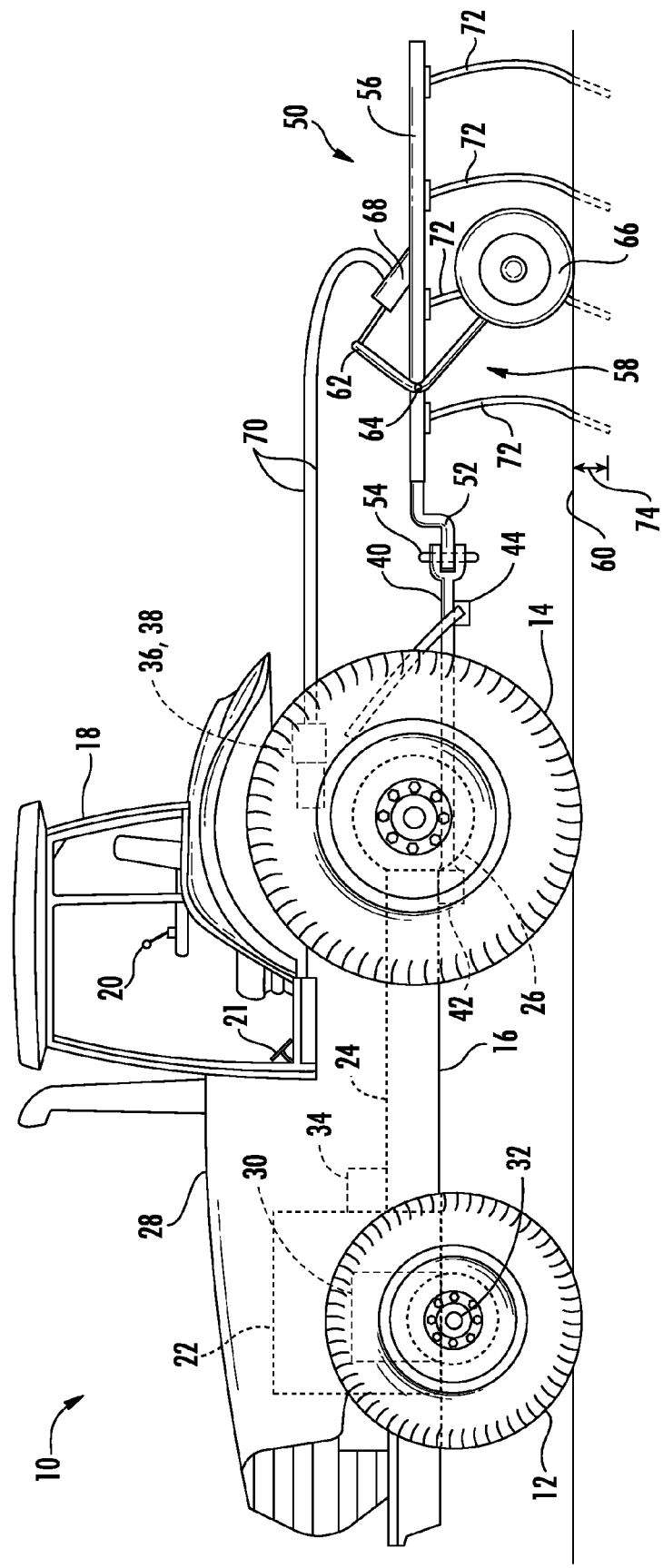
FIG. 1 illustrates a side view of one embodiment of a work vehicle towing a drawn implement via a drawbar in accordance with aspects of the present subject matter, particularly illustrating the drawn implement at a lowered or ground-engaging position relative to a driving surface of the vehicle.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for providing improved ride control for a work vehicle when transporting a drawn implement via a drawbar-related component of the vehicle (e.g., a drawbar or a drawbar support member of the work vehicle). Specifically, in several embodiments, the disclosed system and method may allow for variations in the load transmitted from the drawn implement to the work vehicle to be detected as the implement is being transported. Such load variations may be due, for example, to the implement vibrating or moving up and down while transporting the implement along a paved or unpaved roadway at relatively high vehicle speeds. Upon detection of the load variation, a suitable control action(s) may then be implemented to reduce the magnitude of the variation in the load.

For example, in one embodiment, one or more sensors may be provided in operative association with one or more drawbar-related components of the work vehicle for detecting the vertical load transmitted through such component(s) from the implement. In addition, a controller may be communicatively coupled to the sensor(s) to allow the controller to monitor the vertical loads being transmitted through the drawbar-related component(s). By monitoring such loads, the controller may be configured to detect variations in the load over time that, when transferred from the drawbar-related component(s) to the chassis of the work vehicle, tend to significantly impact the driving performance of the vehicle and/or the smoothness of the ride provided to the operator (e.g., by comparing the load variation to a predetermined load variance threshold). For example, high magnitude variations in the vertical load transmitted through the drawbar-related component(s) may result in the front end of the vehicle lifting or otherwise pivoting upward slightly about its rear wheels, which can negatively impact the vehicle's driving performance (e.g., steering) and/or the smoothness of the ride. When such load variations are detected, the controller may be configured to control or adjust the operation of an implement suspension system associated with the drawn implement and/or a vehicle suspension system associated with the work vehicle in a manner that dampens the vertical loading, thereby reducing the overall load variability. For instance, the controller may be configured to control the operation of the implement suspension system so as to raise or lower one or more components of the implement (e.g., a frame or a ground-engaging tool(s) of the implement) relative to the driving surface of the vehicle in a manner that dampens the vertical loading. In additional to such control of the implement suspension system (or as an alternative thereto), the controller may also be configured to control the operation of the implement suspension system so as to raise or lower a front axle of the vehicle relative to the vehicle's driving surface (and/or relative to the chassis of the vehicle) in a manner that dampens the vertical loading.

Figure 2:
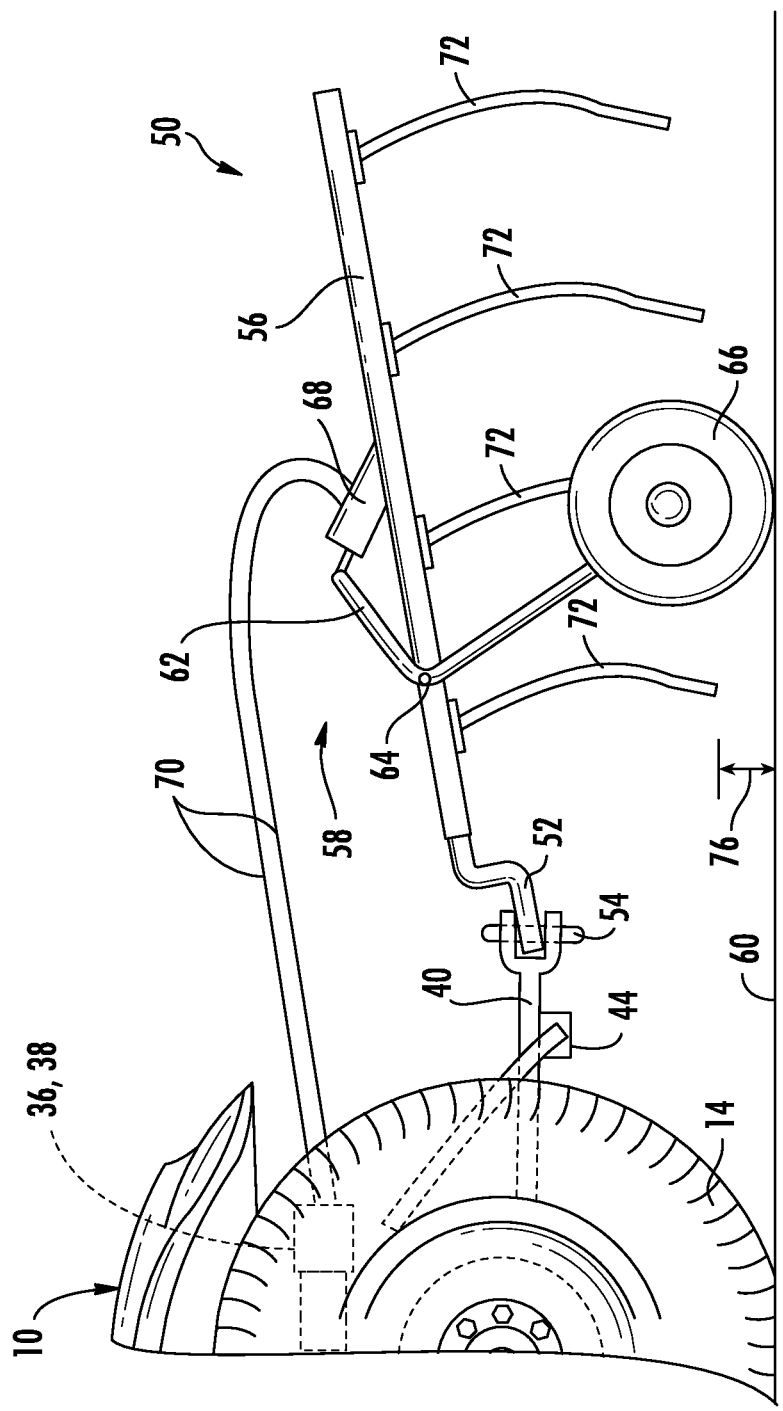
FIG. 2 illustrates another side view of the drawn implement shown in FIG. 1, particularly illustrating the drawn implement at a raised or transport position relative to the driving surface of the vehicle.

Referring now to FIGS. 1 and 2, differing views of one embodiment of a work vehicle 10 that may be used to transport a drawn implement 50 are illustrated in accordance with aspects of the present subject matter. In particular, FIG. 1 illustrates a side view of the work vehicle 10 towing the implement 50 when the implement is located at its lowered or ground-engaging position. Additionally, FIG. 2 illustrates a side view of the drawn implement 50 shown in FIG. 1 when the implement 50 is at its raised or transport position (also commonly referred to as a headlands position). As shown, the work vehicle 10 is configured as an agricultural tractor. However, in other embodiments, the work vehicle 10 may be configured as any other suitable work vehicle known in the art that is configured to transport a drawn implement 50.

As shown in FIG. 1, the work vehicle 10 includes a pair of front wheels (and associated front tires 12), a pair or rear wheels (and associated rear tires 14) and a frame or chassis 16 coupled to and supported by the wheels. However, in other embodiments, the work vehicle 10 may include two or more pairs of front tires 12 and/or two or more pairs of rear tires 14, such as in the case of a dual or triple tire configuration. An operator's cab 18 may be supported by a portion of the chassis 16 and may house various input devices 20, 21 for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels via a drive axle assembly 26 (or via axles if multiple drive axles are employed).

The work vehicle 10 may also include a hood 28 extending from the cab 18 towards the front end of the vehicle 10. As is generally understood, the hood 28 may be configured to house the engine 22 and various other under-hood components of the work vehicle 10 (e.g., various hydraulic systems, pneumatic systems, electrical systems, mechanical systems, fluid storage tanks and/or the like). For instance, a suspension system 30 may be disposed under the hood 28 that allows for a front axle 32 of the work vehicle 10 to be moved relative to the chassis 16. Specifically, the suspension system 30 may be configured such that the front axle 32 of the vehicle 10 is capable of moving vertically relative to the chassis 16, thereby providing a means for damping the vertical movement of the front axle 32. Alternatively, the suspension system 30 may correspond to an independent link suspension. In such an embodiment, the suspension system 30 may be configured such that independently actuatable arms (not shown) of the work vehicle 10 are capable of moving vertically relative to the chassis 16.

The work vehicle 10 may also include one or more auxiliary systems coupled to the engine 22. For example, as shown in FIG. 1, the work vehicle 10 may include a hydraulic system 34 that serves to provide a source of pressurized hydraulic fluid for powering various actuators used for driving and/or positioning the drawn implement 50 and/or other detachable equipment. Specifically, as shown in the illustrated embodiment, the hydraulic system 34 may include or may be coupled to one or more implement valves 36, 38 for controlling the flow of hydraulic fluid to one or more actuators associated with the drawn implement 50.

Additionally, as shown in FIG. 1, the work vehicle may, in one embodiment, include a drawbar 40 configured to be coupled to the implement 50. Specifically, the drawbar 40 may provide a connection point for coupling the drawn implement 50 to the work vehicle 10. For example, as shown in the illustrated embodiment, one end of the drawbar 40 may be coupled to the rear end of the chassis 16 via a pivot bracket 42 and an opposed end of the drawbar 40 may be coupled to a tongue 52 of the implement 50 (e.g., via a hitch pin 54). Moreover, as shown in FIGS. 1 and 2, the drawbar 40 may be configured to be vertically supported by a drawbar support member 44. For instance, the drawbar support member 44 may be coupled to the chassis 16 so as to extend outwardly therefrom to a location directly below the drawbar 40, thereby allowing the support member 44 to provide vertical support for the drawbar 40.

In other embodiments, any other suitable type of hitch configuration may be used to couple the implement 50 to the vehicle chassis 16. For example, as will be described below with reference to FIG. 5, as an alternative to the hitch pin 54, a ball-type hitch 160 may be secured to the drawbar 40 for coupling the implement 50 to the chassis 16. Alternatively, as will be described below with reference to FIG. 6, a ball-type hitch 160 may be secured to the drawbar support member 44 to allow the implement 50 to be coupled to the chassis 16.

As shown in FIGS. 1 and 2, the implement 50 may generally include a frame 56 and an implement suspension system 58 configured to raise and lower the frame 56 (and/or any other suitable components of the implement 50) relative to a driving surface 60 of the work vehicle 10. In several embodiments, the implement suspension system 58 may include a suspension bar 62 pivotally coupled to the frame 56 at a pivot point 64, with the suspension bar 62 being coupled to one or more wheels 66 of the implement 50 at one end and one or more implement cylinders 58 at the opposed end. As such, by extending/retracting the implement cylinder(s) 58, the suspension bar 62 may be pivoted counterclockwise or clockwise relative to the frame 56 about the pivot point 64, thereby adjusting the position of the frame 56 relative to the driving surface 60.

As shown in FIGS. 1 and 2, the implement cylinder(s) 68 may be fluidly coupled to the implement valve(s) 36, 38 by one or more hoses 70, thereby allowing the supply of hydraulic fluid to the cylinder(s) 68 to be controlled by the valve(s) 36, 38. In such an embodiment, the operation of the valve(s) 36, 38 may be controlled (e.g., based on operator inputs or control signals generated by the disclosed system) to allow the frame 56 to be automatically raised and lowered relative to the driving surface 60. For example, in the illustrated embodiment, by controlling the operation of the valve(s) 36, 38 such that the cylinder(s) 68 is extended, the suspension bar 62 may be rotated in the counterclockwise direction relative to the frame 56, thereby causing the frame 56 to be lowered relative to the driving surface 60. Similarly, by controlling the operation of the valve(s) 36, 38 such that the cylinder(s) 68 is retracted, the suspension bar 62 may be rotated in the clockwise direction relative to the frame 56, thereby causing the frame 56 to be raised relative to the driving surface 60.

Moreover, as shown in FIGS. 1 and 2, the implement 50 may include one or more ground-engaging tools 72 that are coupled to and extend downwardly from the frame 56. In general, the ground-engaging tool(s) 72 may correspond to any suitable implement tools or devices configured to selectively engage the ground or driving surface 60 of the work vehicle 10, such as one or more plows, discs, rakes, planter modules, harrows and/or any other suitable ground cultivating and/or conditioning devices or tools. As shown in FIG. 1, when the implement 50 is moved to its lowered or ground-engaging position, the ground-engaging tools 72 may be configured to contact or otherwise penetrate the vehicle driving surface 60. For example, in the illustrated embodiment, the ends of the ground-engaging tools 72 may be configured to be positioned on or at a given depth 74 relative to the vehicle driving surface 60 when the implement 50 is located at its lowered or ground-engaging position. Similarly, as shown in FIG. 2, when the implement 50 is moved to its raised or transport position, the frame 56 may be raised relative to the vehicle driving surface 60 such that the ground-engaging tools 72 no longer contact or engage such surface 60. Specifically, as shown in the illustrated embodiment, the ground-engaging tools 72 may be raised to a given height 76 above the vehicle driving surface 60 when the implement 50 is moved to its raised or transport position. As indicated above, the implement 50 may be moved to such position when transporting the implement 50 to and/or from the field, such as when the vehicle 10 is being driven along a paved or unpaved road.

It should be appreciated that the configuration of the work vehicle 10 described above and shown in FIGS. 1 and 2 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 22, transmission 24, and drive axle assembly 26 are coupled, a configuration common in smaller tractors. Still other configurations may use an articulated chassis to steer the work vehicle 10, or rely on tracks in lieu of the tires 12, 14.

It should also be appreciated that the configuration of the implement 50 described above and shown in FIGS. 1 and 2 is only provided for exemplary purposes. Thus, it should be appreciated that the present subject matter may be readily adaptable to any manner of implement configuration. For example, in an alternative embodiment, the implement suspension system 58 may include one or more actuators or implement cylinders configured to raise and lower the ground-engaging tools 72 relative to the frame 56 (and relative to the vehicle's driving surface 60). In such an embodiment, as opposed to raising or lowering the entire frame 56, the ground-engaging tools 72 may be raised relative to the frame 56 and the vehicle's driving surface 60 to move the implement 50 to its raised or transport position and may be lowered relative to the frame 56 and the driving surface 60 to move the implement 50 to its lowered or ground-engaging position.

Figure 3:
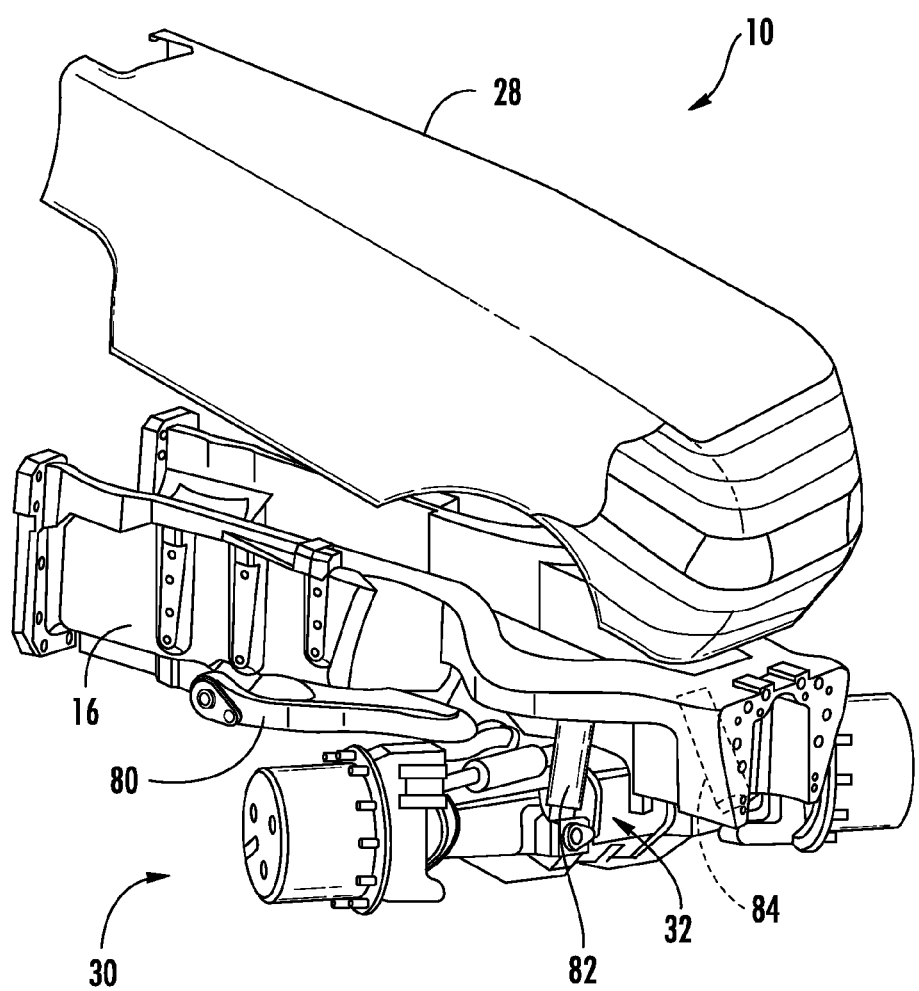
FIG. 3 illustrates a partial, perspective view of a front end of the work vehicle shown in FIG. 1 with various components being removed from the vehicle for purposes of illustration, particularly illustrating one embodiment of components that may be included within a vehicle suspension system of the work vehicle.

Referring now to FIG. 3, a front, perspective view of one embodiment of a suspension system 30 that may be utilized with the work vehicle 10 described above is illustrated in accordance with aspects of the present subject matter. As shown, the suspension system 30 may include an axle carrier 80 configured to extend between the chassis 16 and the front axle 32 of the work vehicle 10. In general, the axle carrier 80 may be configured to rotate relative to the chassis 16 to facilitate vertical movement of the front axle 32 relative to chassis 16. In addition, the suspension system 30 may also include one or more suspension cylinders, such as a first suspension cylinder 82 and a second suspension cylinder 84 (shown in dashed lines in FIG. 3) coupled between the font axle 32 and the chassis 16. As is generally understood, extension of the piston rods associated with the suspension cylinders 82, 84 may induce the front axle 32 to move vertically downward relative to the chassis 16 while retraction of the piston rods may induce the front axle 32 to move vertically upward relative to the chassis 16.

It should be appreciated that, in other embodiments, the suspension system 30 may include any other components and/or may have any other suitable suspension configuration. For example, as indicated above, the suspension system 30 may correspond to an independent link suspension. In such an embodiment, the suspension system 30 may include links or arms (e.g., A-arms) configured to be independently actuated relative to the chassis 16.

Figure 4:
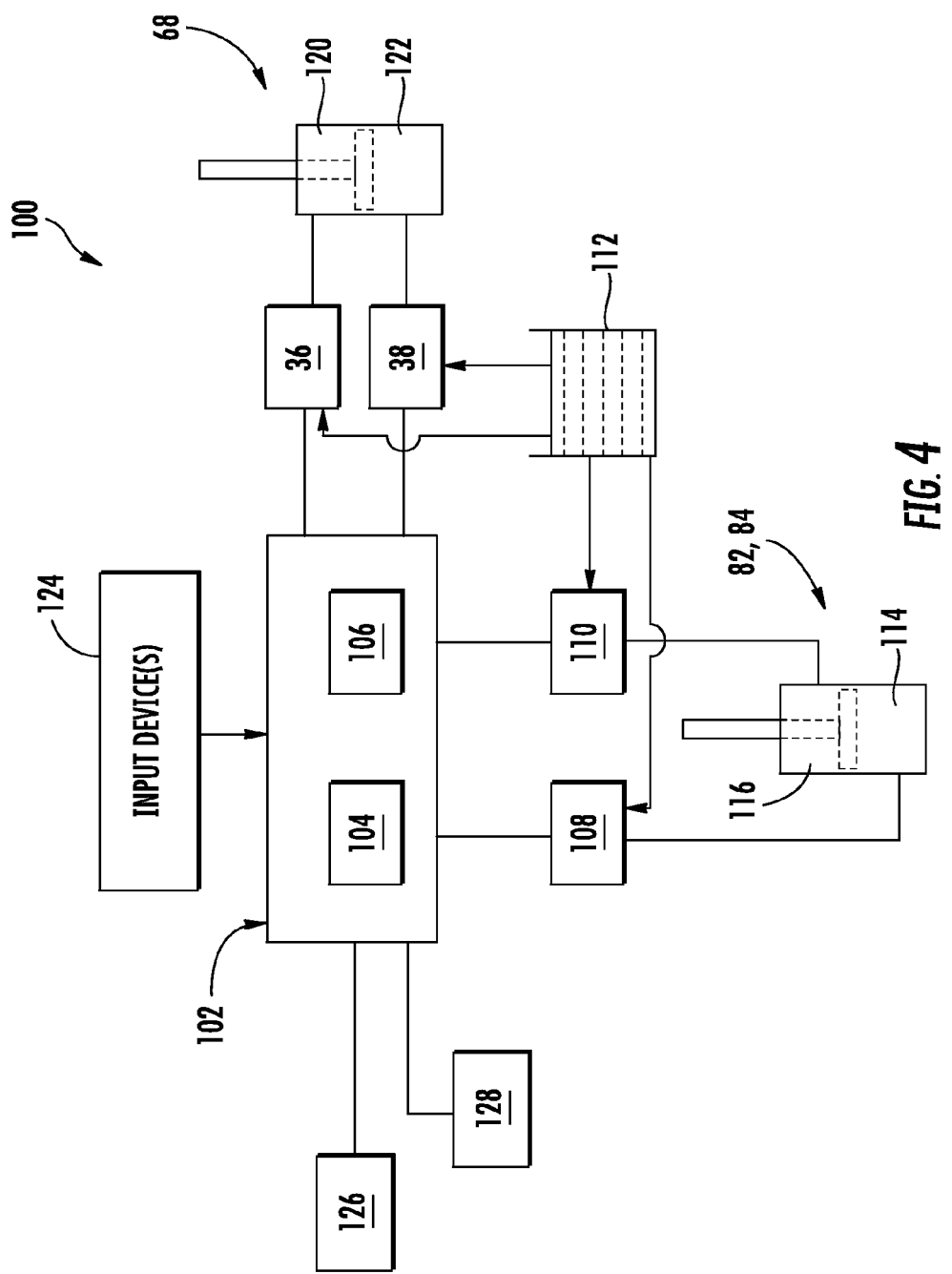
FIG. 4 illustrates a schematic view of one embodiment of a system for providing improved ride control for a work vehicle when transporting a drawn implement in accordance with aspects of the present subject matter.

Referring now to FIG. 4, a schematic diagram of one embodiment of a system 100 for providing improved ride control for a work vehicle when transporting a drawn implement is illustrated in accordance with aspects of the present subject matter. In general, the system 100 will be described herein with reference to the work vehicle 10 and implement 50 described above with reference to FIGS. 1-3. However, it should be appreciated by those of ordinary skill in the art that the disclosed system 100 may generally be utilized with work vehicles 10 having any other suitable vehicle configuration and/or with implements 50 have any other suitable implement configuration.

As shown, the control system 100 may generally include a controller 102 configured to electronically control the operation of one or more components of the work vehicle 10 and/or the implement 50, such as the various hydraulic components of the vehicle suspension system 30 and/or the implement suspension system 58 (e.g., the suspension cylinders 82, 84 and/or the implement cylinder(s) 68). In general, the controller 102 may comprise any suitable processor-based device known in the art, such as a computing device or any suitable combination of computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 106 of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 106 may generally be configured to store suitable computer-readable instructions that, when implemented by the processor(s) 104, configure the controller 102 to perform various computer-implemented functions, such as one or more aspects of the method 200 described below with reference to FIG. 7. In addition, the controller 102 may also include various other suitable components, such as a communications circuit or module, one or more input/output channels, a data/control bus and/or the like.

It should be appreciated that the controller 102 may correspond to an existing controller of the work vehicle 10 or the controller 102 may correspond to a separate processing device. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

In several embodiments, the controller 102 may be configured to be coupled to suitable components for controlling the operation of the suspension cylinders 82, 84 of the work vehicle 10. For example, as shown in FIG. 4, the controller 102 may be communicatively coupled to suitable pressurize regulating valves 108, 110 (PRVs) (e.g., solenoid-activated valves) configured to regulate the pressure of hydraulic fluid supplied to each suspension cylinder 82, 84 (e.g., from a hydraulic fluid tank 112 or pump of the work vehicle 10). Specifically, as shown schematically in FIG. 4, the controller 102 may be coupled to both a first PRV 108 configured to regulate the pressure of the hydraulic fluid supplied to a cap end 114 of one of the suspension cylinders 82, 84 and a second PRV 110 configured to regulate the pressure of the hydraulic fluid supplied to a rod end 116 of such cylinder 82, 84. In such an embodiment, the current supplied to each PRY 110, 112 may be directly proportional to the pressure supplied at each end 114, 116 of the cylinder 82, 84, thereby allowing the controller 102 to control the displacement of the cylinder 82, 84. It should be appreciated that, although FIG. 4 only illustrates the controller 102 coupled to suitable PRVs for controlling the operation of one of the suspension cylinders 82, 84, similar hydraulic components may be utilized to control the other suspension cylinder 82, 84. For instance, the controller 102 may be coupled to another pair of PRVs configured to control the pressure of the hydraulic fluid supplied to each end of the other suspension cylinder 82, 84, thereby allowing the displacement of each cylinder 82, 84 to be independently controlled.

In addition, the controller 102 may be configured to similarly control the operation of the implement cylinder(s) 68. For example, as indicated above, the controller 102 may be communicatively coupled to one or more implement valves 36, 38 (e.g., solenoid-activated valves) configured to regulate the pressure of the hydraulic fluid supplied to the implement cylinder(s) 68. Specifically, as shown schematically in FIG. 4, the controller 102 may be coupled to both a first implement valve 36 configured to regulate the pressure of the hydraulic fluid supplied to a rod end 120 of the implement cylinder(s) 68 and a second implement valve 38 configured to regulate the pressure of the hydraulic fluid supplied to a cap end 120 of such cylinder(s) 68. In such an embodiment, the current supplied to each implement valve 36, 38 may be directly proportional to the pressure supplied at each end 120, 122 of the cylinder(s) 68, thereby allowing the controller 102 to control the displacement of the cylinder (s) 68.

As shown in FIG. 4, the controller 102 may also be communicatively coupled to one or more input devices 124 for providing operator inputs to the controller 102. For instance, the controller 102 may be coupled to a control panel and/or any other suitable input device housed within the operator's cab 18 to allow operator inputs to be received by the controller 102. In one embodiment, the operator inputs may correspond to operator-initiated commands associated with raising or lowering the implement 50 relative to the vehicle's driving surface 60. In such an embodiment, upon receipt of the operator input(s), the controller 102 may control the operation of the implement valves 36, 38 to facilitate raising or lowering the implement 50.

Moreover, as shown in FIG. 4, the controller 102 may be communicatively coupled to one or more drawbar-related sensors 126 configured to detect a load applied to one or more drawbar-related components of the work vehicle 10 by the implement 50. Specifically, in accordance with aspects of the present subject matter, the drawbar-related sensor(s) 126 may be used to detect the vertical loads applied through the drawbar 40 and/or the drawbar support member 44 when the implement 50 is located at its raised or transport position and is being transported by the work vehicle 10. By receiving signals from the drawbar-related sensor(s) 126, the controller 102 may be configured to continuously monitor the vertical loading being transmitted from the implement 50 to the work vehicle 10 via the drawbar 40 and/or the support member 44. As such, the controller 102 may be configured to detect variations in the vertical loading transmitted from the implement 50 over time, which may be caused by the implement vibrating or bouncing up and down behind the work vehicle 10. As indicated above, such variations in the vertical loading may significantly impact the driving, performance of the vehicle 10 and/or the smoothness of the ride provided to the operator.

As will be described in detail below, the controller 102 may, in several embodiments, be configured to automatically control the operation of the vehicle suspension system 30 and/or the implement suspension system 58 so as to reduce the magnitude of the variability in the vertical loading being transmitted through the drawbar 40 and/or the support member 44 as the implement 50 is being transported. Specifically, when the variability in the monitored load exceeds a predetermined threshold, the controller 102 may be configured to control the actuation of the suspension cylinders 82, 84 and/or the implement cylinder(s) 68 in a manner that dampens the load, thereby reducing the load variability. Such a reduction in the load variability may significantly improve the driving performance of the vehicle 10 and/or the smoothness of the ride provided to the operator as the implement 50 is being transported.

It should be appreciated that the controller 102 may also be coupled to any other suitable sensor(s) configured to monitor any other suitable operating parameters of the work vehicle 10 and/or the implement 50. For instance, in one embodiment, the controller 102 may be coupled to a ground speed sensor 128 to allow the controller 102 to monitor the ground speed of the work vehicle 10. Such ground speed measurements may allow the controller 102 to determine whether the detected load variations are occurring while the implement 50 is being transported by the work vehicle 10. For instance, if the ground speed of the work vehicle 10 exceeds a given speed threshold, the controller 102 may determine that the load variations are being caused by the implement 50 vibrating or bouncing up and down as the implement 50 is being transported. The controller 102 may then implement a suitable control action (e.g., by controlling the operation of the vehicle suspension system 30 and/or the implement suspension system 58) in order to reduce the magnitude of the load variation.

Figure 5:
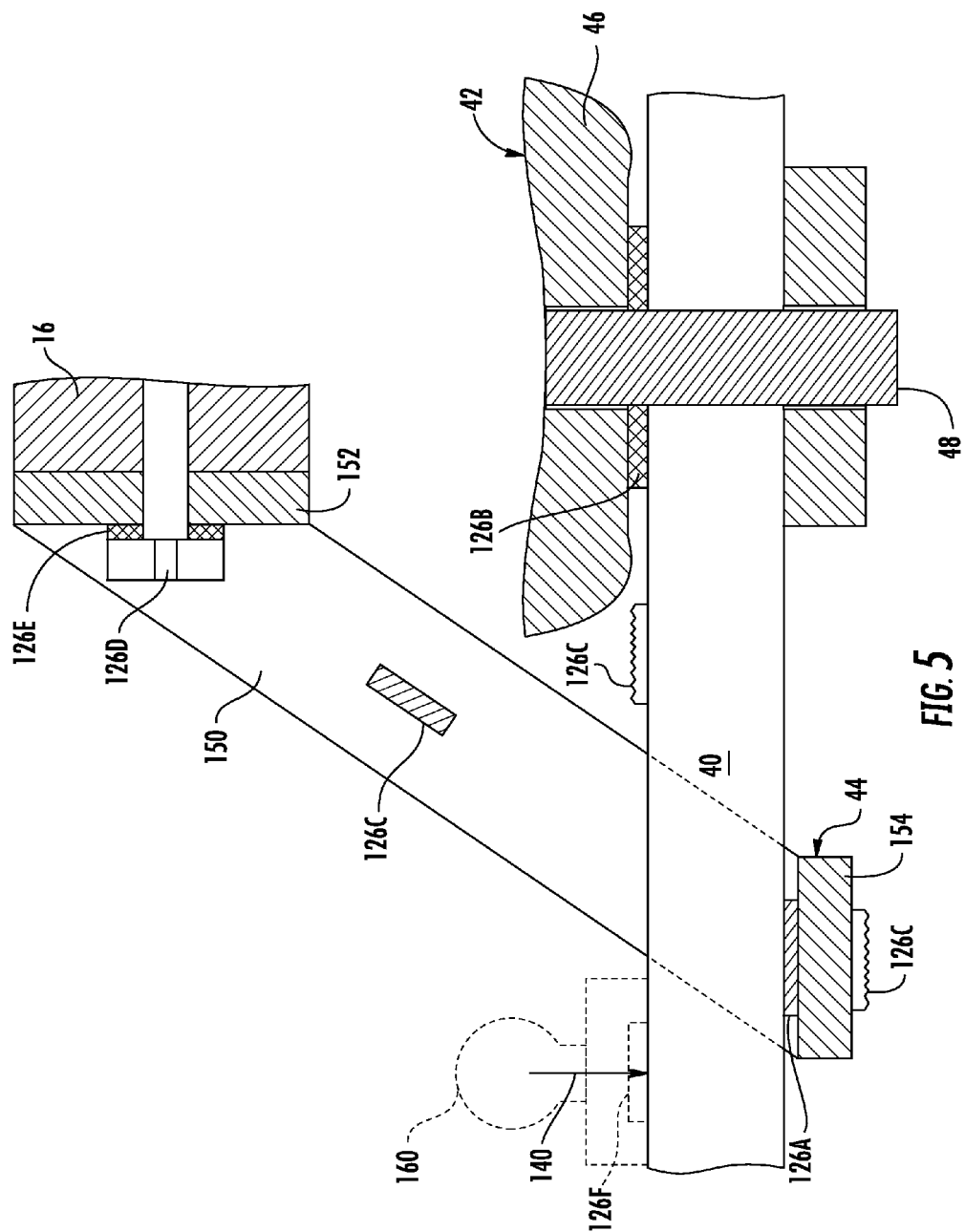
FIG. 5 illustrates a simplified view of portions of the drawbar and a drawbar support member shown in FIGS. 1 and 2, particularly illustrating various sensor arrangements that may be utilized to detect loads transmitted through the drawbar and/or support member from the drawn implement.

Referring now to FIG. 5, a simplified view of a portion of the drawbar 40 and the drawbar support member 44 shown in FIGS. 1 and 2 is illustrated in accordance with aspects of the present subject matter, particularly illustrating various examples of drawbar-related sensors and/or sensor arrangements that may be utilized in accordance with aspects of the present subject matter to detect the loads being transmitted through the drawbar 40 and/or the support member 44 from the drawn implement 50. In general, the drawbar-related sensor(s) 126 may correspond to any suitable sensor(s) and/or sensing device(s) and/or may be configured to be positioned at any suitable location relative to the drawbar 40 and/or the support member 44 that allows the sensor(s) 12.6 to detect the vertical load applied through the drawbar/support member 40, 44. For example, as shown in FIG. 5, a downward vertical load (e.g., as indicated by arrow 140) may be applied to the drawbar 40 and/or the support member 44 by the implement 50 at the connection between the drawbar 40 (or the drawbar support member 44) and the implement tongue (not shown in FIG. 5). When transmitted through the drawbar 40 and/or the drawbar support member 44 to the vehicle chassis 16, the downward vertical load 140 may tend to cause the front end of the vehicle 10 to pivot upwardly about the rear wheels 14, which can negatively impact the driving performance of the work vehicle 10.

As shown in FIG. 5, in one embodiment, the drawbar-related sensor(s) 126 may correspond to one or more load sensors 126A (e.g., a pressure sensor(s)) positioned between the drawbar 40 and the drawbar support member 44. In such an embodiment, the load sensor(s) 126A may be configured to detect the load transmitted between the drawbar 40 and the support member 44, which may be indicative of the vertical load being applied to the drawbar 40 and/or the support member 44 via the implement 50.

In another embodiment, the drawbar-related sensor(s) 126 may correspond to one or more load sensors 126B (e.g., a pressure sensor(s)) positioned between the drawbar 40 and the drawbar pivot bracket 42 (or the vehicle Chassis 16). For example, as shown in FIG. 5, the load sensor(s) 12.6B may be positioned between the drawbar 40 and an upper portion 46 of the pivot bracket 42 (or the vehicle chassis 16). As such, the load sensor(s) 126B may be configured to detect the reaction load transmitted between the drawbar 40 and the pivot bracket 42 (or the vehicle chassis 16), which may be indicative of the vertical load being applied to the drawbar 40 via the implement 50. It should be appreciated that, in one embodiment, the load sensor(s) 126B may correspond to a pressure sensing washer or other suitable donut-shaped sensor such that the load sensor(s) 126B may be positioned around a portion of a pivot pin 48 configured to couple the drawbar 40 to the pivot bracket 42 (or the vehicle chassis 16). Alternatively, the load sensor(s) 126B may be positioned at the interface defined between the drawbar 40 and the pivot bracket 42 (or the vehicle chassis 16) without be received around the pivot pin 48.

In a further embodiment, the drawbar-related sensor(s) 126 may correspond to one or more strain gauges 126C positioned on the drawbar 40, such as along the top or bottom of the drawbar 40, and/or on the rear support member 44, such as along the bottom of the support member 44 and/or along a side portion 150 of the support member 44. In such an embodiment, the strain gauge(s) 126C may be configured to detect the strain applied through the drawbar 40 and/or the support member 44, which may be indicative of the vertical load being applied to the drawbar 40 and/or support member 44 via the implement 50.

In yet another embodiment, the drawbar-related sensor(s) 126 may correspond to a load sensing bolt 126I) provided in operative associated with the drawbar 44 and/or the support member 44. For example, as shown in FIG. 5, a load sensing bolt 126D may be used to couple the support member 44 to a portion of the vehicle chassis 16. In such an embodiment, the load sensing bolt 126D may be configured to detect the load transmitted through the drawbar support member 44, which may be indicative of the vertical load being applied to the support member 44 via the implement 50.

In addition to the load sensing bolt 126 D (or as an alternative thereto), a load sensor 126E (e.g., a load-sensing washer) may be provided between any bolts being used to couple the drawbar 44 and/or the support member 44 to a component of the work vehicle 10 and/or a component of the implement 50. For example, as shown in FIG. 5, the load sensor 126E may be provided at the interface defined between the bolt and an attachment portion 152 of the drawbar support member 44. In such an embodiment, the load sensor 126E may be configured to detect the load transmitted through the drawbar support member 44, which may be indicative of the vertical load being applied to the support member 44 via the implement 50.

As indicated above, it should be appreciated that the work vehicle 10 may be provided with any suitable hitch arrangement for coupling the implement 50 to the vehicle chassis 16. For example, as described above with reference to FIGS. 1 and 2, a hitch pin 54 may be used to couple the drawbar 40 to the tongue 52 of the implement 50. Alternatively, a ball hitch-type arrangement may be provided for coupling the implement 50 to the vehicle chassis 16. For example, as shown by the dashed lines in FIG. 5, a ball hitch 160 may be coupled to the drawbar 40. In such an embodiment, the tongue 52 of the implement 50 may be configured to be coupled to the ball hitch 160.

Additionally, when the ball hitch 160 is being used, one or more drawbar related sensors 126 may be provided at or adjacent to the hitch 160. For example, as shown in FIG. 5, a load sensor (Shown by dashed lines 126F) may be provided at the interface defined between the ball hitch 160 and the drawbar 40. In such an embodiment, the load sensor 126F may be configured to detect the load transmitted between the hitch 160 and the drawbar 40, which may be indicative of the vertical load being applied to the drawbar 40 via the implement 50.

Figure 6:
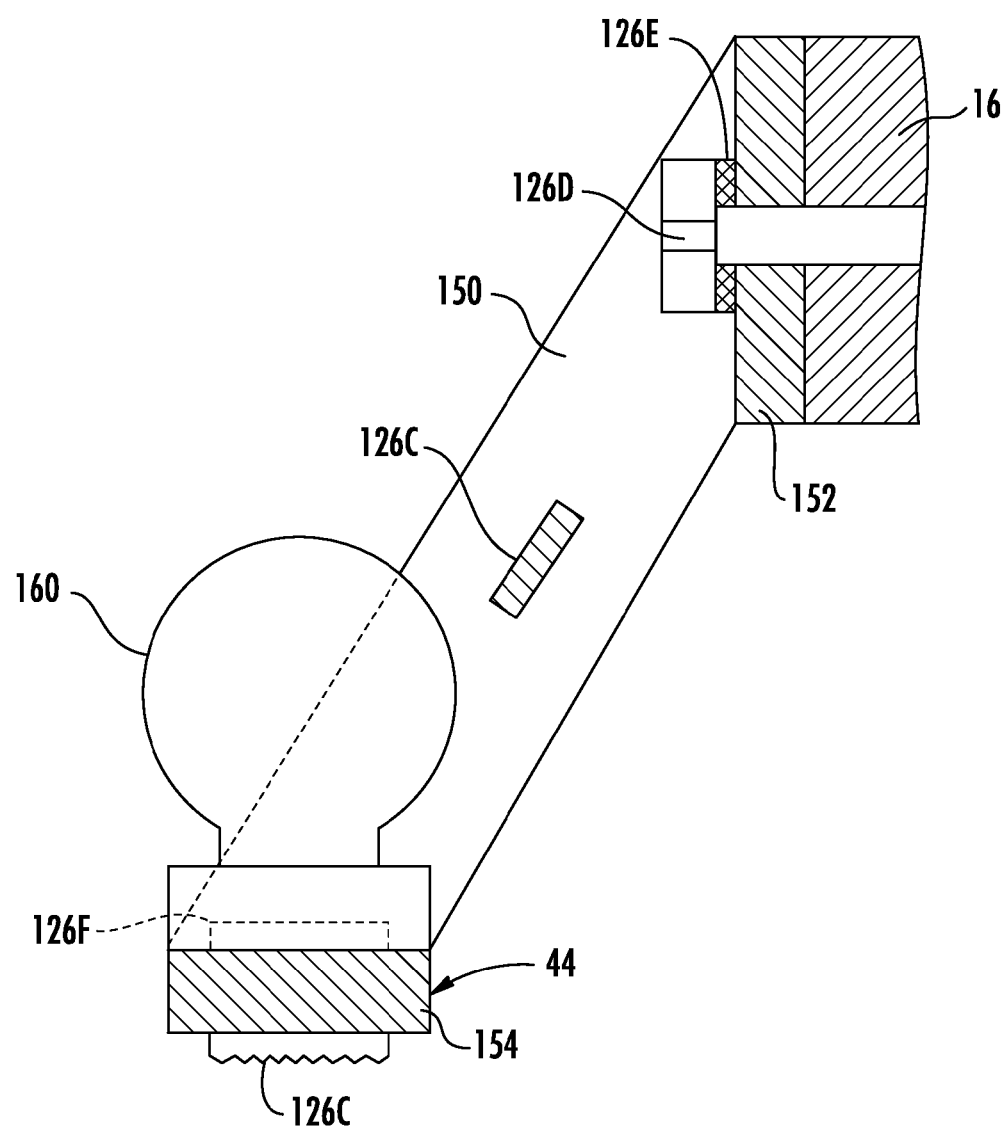
FIG. 6 illustrates another simplified view of a portion of the drawbar support member shown in FIG. 5 with the drawbar removed and a ball-type hitch being installed on the support member, particularly illustrating various sensor arrangements that may be utilized to detect loads transmitted through the support member from the drawn implement.

Alternatively, the ball hitch 160 may be configured to be coupled directly to the drawbar support member 44. For example, FIG. 6 illustrates a similar view of the support member 44 shown in FIG. 5 with the drawbar 40 and the pivot bracket 42 being removed. As shown in FIG. 6, the ball hitch 160 may be coupled to a bottom portion 154 of the drawbar support member 44, which is typically located directly adjacent to the drawbar 40. In such an embodiment, any number of drawbar-related sensors 126 may be provided in operative association with the drawbar support member 44 to allow for the detection of vertical loads applied through the support member 44 by the implement 50. For example, as shown in FIG. 6, similar to the embodiment described above with reference to FIG. 5, one or more strain gauges 126C may be positioned on the support member 44, a load sensing bolt 126D may be used to couple the support member 44 to the vehicle chassis 16, a load sensor 126E may be provided in operative association with any bolts and/or a load sensor 126F may be disposed between the ball hitch 160 and the support member 44.

It should be appreciated that, in other embodiments, the drawbar-related sensor(s) 126 may correspond to any other suitable sensor(s) and/or sensing device(s) configured to detect the vertical loads being transmitted through the drawbar 40 and/or the support member 44. It should also be appreciated that, although the various sensors 126A, 126B, 126C shown in FIG. 5 were described above as separate embodiments, such sensors 126A, 126B, 126C, 126D, 126E, 126F may also be provided in operative association with the drawbar 40 and/or the support member 44 in any suitable combination.

Figure 7:
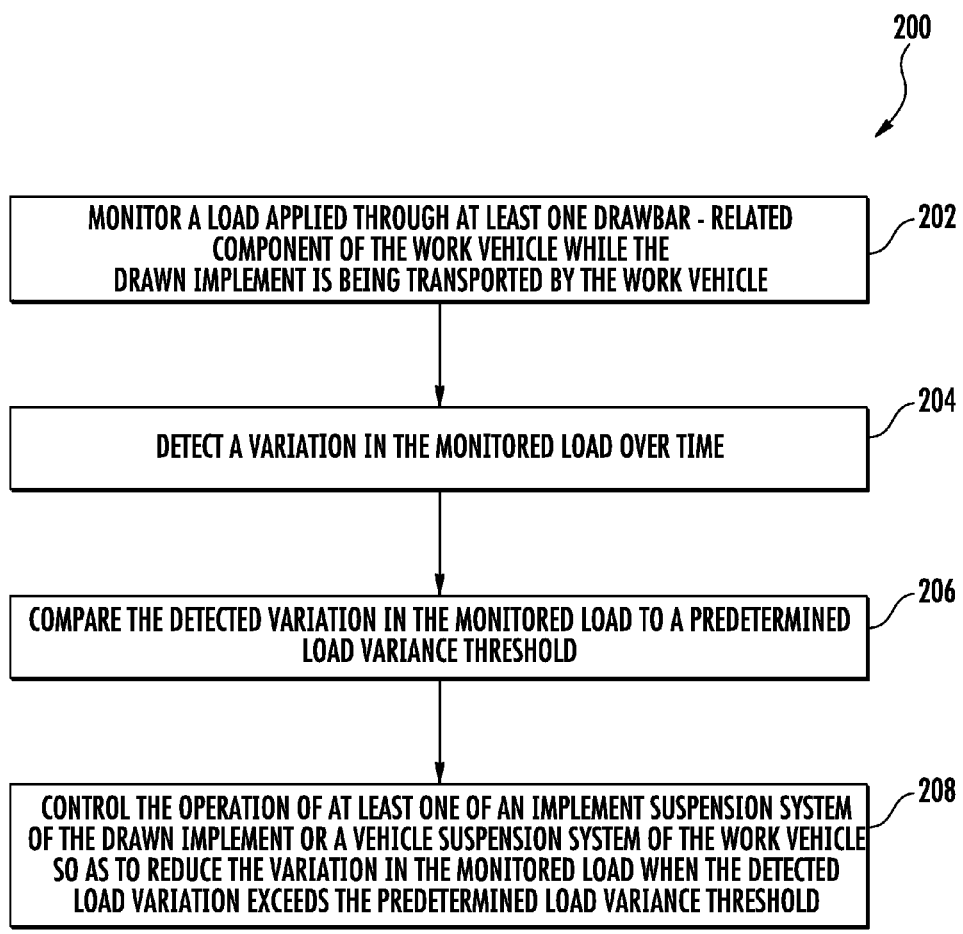
FIG. 7 illustrates a flow diagram of one embodiment of a method for providing improved ride control for a work vehicle when transporting a drawn implement in accordance with aspects of the present subject matter.

Referring now to FIG. 7, a flow diagram of one embodiment of a method 200 for providing improved ride control for a work vehicle transporting a drawn implement is illustrated in accordance with aspects of the present subject matter. In general, the method 200 will be described with reference to the work vehicle 10, the implement 50 and the system 100 described above with reference to FIGS. 1-6. However, it should be appreciated by those of ordinary skill in the art that the disclosed method 200 may generally be utilized to provide improved ride control for work vehicles having any other suitable vehicle configuration, for implements having any suitable other implement configuration and/or for computer-based systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include monitoring a load applied through a drawbar-related component of the work vehicle while the drawn implement is being transported by the work vehicle. Specifically, as indicated above, one or more drawbar-related sensors 126 may be provided in operative association with the drawbar 40 and/or the support member 44 for detecting one or more loads indicative of the vertical load being transmitted through the drawbar/support member 40, 44 from the implement 50. Thus, by receiving measurement signals from the drawbar sensor(s) 126, the controller 102 may be configured to monitor the vertical load being applied, through the drawbar 40 and/or the support member 44 when the implement 50 is located at its raised or transport position and is being hauled or transported by the work vehicle 10.

Additionally, at (204), the method 200 may include detecting a variation in the monitored load over time. Specifically, in several embodiments, the controller 102 may be configured to determine the instantaneous vertical load being transmitted through the drawbar 40 and/or the support member 44 for each new measurement signal(s) received from the drawbar-related sensor(s) 126. The controller 102 may then compare the instantaneous vertical load to one or more previously determined loads to calculate variations in the load over time. For instance, at time $t_0$, the controller 102 may determine the instantaneous vertical load being transmitted through the drawbar 40 and/or the support member 44. Thereafter, at time $t_{0+\Delta t}$ (wherein $\Delta t$ corresponds to the sampling rate of the controller 102 or any other suitable time period), the controller 102 may determine a new instantaneous vertical load being transmitted through the drawbar 40 and/or the support member 44. The vertical load determined at time $t_{0+\Delta t}$ may then be compared to the vertical load determined at time $t_0$ to calculate the variation in the monitored load.

Referring still to FIG. 7, at (206), the method 200 may include comparing the detected variation in the monitored load to a predetermined load variance threshold. Specifically, in several embodiments, the controller 102 may include a predetermined load variance threshold stored within its memory 106 that corresponds to a threshold rate of change for the monitored load with respect to time at which the controller 102 is configured to implement a suitable control action to reduce the load variation. In such embodiments, the threshold rate of change may be set or determined based on the desired driving performance for the work vehicle 10 and/or the desired smoothness of the ride provided to the operator when transporting the drawn implement 50. For instance, the threshold rate of change may be set or determined such that, when the variation in the load over time is less than the predetermined threshold, such load variation may be considered to have little or no impact on the driving performance of the work vehicle 10 and/or the smoothness of the ride. However, when the variation in the load over time exceeds the predetermined threshold, it may be indicative that the load variation is substantial enough to significantly impact the driving performance of the work vehicle 10 and/or the smoothness of the ride. Additionally, the threshold rate of change associated with the predetermined threshold may be varied with changes in the speed of the work vehicle 10.

Additionally, at (208), the method 200 may include controlling the operation of at least one of an implement suspension system of the drawn implement or a vehicle suspension system of the work vehicle so as to reduce the variation in the monitored load when the detected load variation exceeds the predetermined load variance threshold. Specifically, as indicated above, the controller 102 may be configured to actively control the operation of the suspension cylinders 82, 84 and/or the implement cylinder(s) 68 (e.g., via control of their corresponding valves) so as to dampen the load being transmitted to the work vehicle 10 from the implement 50, thereby reducing the variability in the load. In one embodiment, the operation of the implement suspension system 58 and the vehicle suspension system 30 may be controlled in combination to dampen the load transmitted to the work vehicle 10 from the implement 50, such as by actively raising or lowering the front axle 32 relative to the chassis 16 while simultaneously raising or lowering the implement frame 56 and/or ground-engaging tools 72 relative to the vehicle's driving surface 60. In such an embodiment, the control strategy implemented by the controller 102 for controlling the operation of the implement suspension system 58 and the vehicle suspension system 30 (e.g., raising versus lowering, the distance the front axle/implement 32, 50 is raised/lowered and/or the rate at which the front axle/implement 32, 50 is raised/lowered) may be varied depending on the magnitude of the load variation, the travel speed of the work vehicle 10, the configuration of the implement 50 (e.g., the weight of the implement 50 and/or the location of the center of gravity of the implement 50) and/or any other suitable factors. For instance, for significantly high load variations and/or when the vehicle 10 is traveling at high ground speeds, it may be desirable for adjustments in the operation of the vehicle suspension system 30 to serve as the primary damping means for the load, with adjustments in the operation of the implement suspension system 58 only serving as a secondary damping means. Alternatively, for less significant load variations and/or when the vehicle 10 is traveling at lower ground speeds, it may be desirable for adjustments in the operation of the implement suspension system 58 to serve as the primary damping means for the load, with adjustments in the operation of the vehicle suspension system 30 only serving as a secondary damping means.

In other embodiments, the controller 102 may be configured to rely solely on the vehicle suspension system 30 or the implement suspension system 58 to reduce the variation in the monitored load. For instance, in one embodiment, the controller 102 may only be configured to actively control the operation of the suspension cylinders 82, 84 so as to dampen the load being transmitted to the work vehicle 10 from the implement 50. In such an embodiment, when it is determined that the detected load variation exceeds the predetermined load variance threshold, the controller 102 may be configured to raise or lower the front axle 32 relative to the chassis 16 (without adjusting the position of the implement frame 56 and/or ground-engaging tools 72) so as to reduce the load variability. Alternatively, the controller 102 may only be configured to actively control the operation of the implement cylinder(s) 68 so as to dampen the load being transmitted to the work vehicle 10 from the implement 50. In such an embodiment, when it is determined that the detected load variation exceeds the predetermined load variance threshold, the controller 102 may be configured to raise or lower the implement 50 relative to the vehicle's driving surface 60 (without adjusting the position of the front axle 32) so as to reduce the load variability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing improved ride control for a work vehicle when transporting a drawn implement, the method comprising:
monitoring a load applied through at least one drawbar-related component of the work vehicle while the drawn implement is being transported by the work vehicle, the drawn implement being located at a transport position relative to a driving surface of the work vehicle such that a ground engaging tool of the drawn implement is located above the driving surface;
detecting a variation in the monitored load over time;
comparing the detected load variation in the monitored load to a predetermined load variance threshold; and
controlling an operation of at least one of an implement suspension system of the drawn implement or a vehicle suspension system of the work vehicle so as to reduce the detected load variation in the monitored load when the load variation exceeds the predetermined load variance threshold, wherein controlling the operation of the least one of the implement suspension system of the drawn implement or the vehicle suspension system of the work vehicle comprises controlling the operation of the implement suspension system such that the ground-engaging tool is raised or lowered relative to the driving surface as the drawn implement is being transported so as to reduce the detected load variation in the monitored load.

2. The method of claim 1, wherein monitoring the load applied through the at least one drawbar-related component comprises monitoring a vertical load transmitted through the at least one drawbar-related component from the drawn implement.

3. The method of claim 2, wherein the at least one drawbar-related component comprises at least one of a drawbar or a drawbar support member of the work vehicle.

4. The method of claim 3, wherein monitoring the vertical load transmitted through the at least one drawbar-related component comprises receiving signals indicative of the vertical load transmitted through the at least one drawbar-related component from at least one sensor provided in operative association with the drawbar-related component.

5. The method of claim 4, wherein the at least one sensor comprises a load sensor positioned between the drawbar and one of the drawbar support member or a pivot bracket of the work vehicle.

6. The method of claim 4, wherein the at least one sensor comprises a strain gauge positioned on at least one of the drawbar or the drawbar support member.

7. The method of claim 4, wherein the at least one sensor comprises a load-sensing bolt or a load-sensing washer provided in operative association with at least one of the drawbar or the drawbar support member.

8. A method for providing improved ride control for a work vehicle when transporting a drawn implement, the method comprising:
monitoring a load applied through at least one drawbar-related component of the work vehicle while the drawn implement is being transported by the work vehicle, the drawn implement being located at a transport position relative to a driving surface of the work vehicle such that a ground engaging tool of the drawn implement is located above the driving surface;
detecting a variation in the monitored load over time;
comparing the detected load variation in the monitored load to a predetermined load variance threshold; and
controlling an operation of at least one of an implement suspension system of the drawn implement or a vehicle suspension system of the work vehicle so as to reduce the detected load variation in the monitored load when the load variation exceeds the predetermined load variance threshold, wherein controlling the operation of the least one of the implement suspension system of the drawn implement or the vehicle suspension system of the work vehicle comprises controlling the operation of the vehicle suspension system such that a front axle of the work vehicle is raised or lowered relative to a chassis of the work vehicle as the drawn implement is being transported so as to reduce the detected load variation in the monitored load.

9. A method for providing improved ride control for a work vehicle when transporting a drawn implement, the method comprising:
monitoring a load applied through at least one drawbar-related component of the work vehicle while the drawn implement is being transported by the work vehicle, the drawn implement being located at a transport position relative to a driving surface of the work vehicle such that a ground engaging tool of the drawn implement is located above the driving surface;
detecting a variation in the monitored load over time;
comparing the detected load variation in the monitored load to a predetermined load variance threshold; and
controlling an operation of at least one of an implement suspension system of the drawn implement or a vehicle suspension system of the work vehicle so as to reduce the detected load variation in the monitored load when the load variation exceeds the predetermined load variance threshold, wherein controlling the operation of the least one of the implement suspension system of the drawn implement or the vehicle suspension system of the work vehicle comprises raising or lowering a front axle of the work vehicle relative to a chassis of the work vehicle while simultaneously raising or lowering the ground-engaging tool relative to the driving surface as the drawn implement is being transported so as to reduce the detected load variation in the monitored load.

10. A system for providing improved ride control for a work vehicle when transporting a drawn implement, the drawn implement being located at a transport position relative to a driving surface of the work vehicle such that a ground engaging tool of the drawn implement is located above the driving surface, the system comprising:
at least one drawbar-related component extending between the work vehicle and the drawn implement;
at least one sensor provided in operative association with the at least one drawbar-related component so as to detect a load applied through the at least one drawbar-related component; and
a controller communicatively coupled to the at least one sensor, the controller including a processor and associated memory, the memory storing instructions that, when executed by the processor, configure the controller to:
monitor the load applied through the at least one drawbar-related component while the drawn implement is being transported by the work vehicle;
detect a variation in the monitored load over time;

compare the detected load variation in the monitored load to a predetermined load variance threshold; and control an operation of at least one of an implement suspension system of the drawn implement or a vehicle suspension system of the work vehicle so as to reduce the detected load variation in the monitored load when the load variation exceeds the predetermined load variance threshold, wherein controller is configured to control the operation of the implement suspension system such that the ground-engaging tool is raised or lowered relative to the driving surface as the drawn implement is being transported so as to reduce the detected load variation in the monitored load.

11. The system of claim 10, wherein the at least one sensor is configured to detect a vertical load transmitted through the drawbar from the drawn implement.

12. The system of claim 10, wherein the at least one drawbar-related component comprises at least one of a drawbar or a drawbar support member of the work vehicle.

13. The system of claim 12, wherein the at least one sensor comprises a load sensor positioned between the drawbar and one of the drawbar support member or a pivot bracket of the work vehicle.

14. The system of claim 12, wherein the at least one sensor comprises a strain gauge positioned on at least one of the drawbar or the drawbar support member.

15. The system of claim 12, wherein the at least one sensor comprises a load-sensing bolt or a load-sensing washer provided in operative association with at least one of the drawbar or the drawbar support member.

16. System for providing improved ride control for a work vehicle when transporting a drawn implement, the drawn implement being located at a transport position relative to a driving surface of the work vehicle such that a ground engaging tool of the drawn implement is located above the driving surface, the system comprising:

at least one drawbar-related component extending between the work vehicle and the drawn implement;

at least one sensor provided in operative association with the at least one drawbar-related component so as to detect a load applied through the at least one drawbar-related component; and a controller communicatively coupled to the at least one sensor, the controller including a processor and associated memory, the memory storing instructions that, when executed by the processor, configure the controller to:

monitor the load applied through the at least one drawbar-related component while the drawn implement is being transported by the work vehicle;

detect a variation in the monitored load over time;

compare the detected load variation in the monitored load to a predetermined load variance threshold; and control an operation of at least one of an implement suspension system of the drawn implement or a vehicle suspension system of the work vehicle so as to reduce the detected load variation in the monitored load when the load variation exceeds the predetermined load variance threshold, wherein the controller is configured to control the operation of the vehicle suspension system such that a front axle of the work vehicle is raised or lowered relative to a chassis of the work vehicle as the drawn implement is being transported so as to reduce the detected load variation in the monitored load.

17. System for providing improved ride control for a work vehicle when transporting a drawn implement, the drawn implement being located at a transport position relative to a driving surface of the work vehicle such that a ground engaging tool of the drawn implement is located above the driving surface, the system comprising:

at least one drawbar-related component extending between the work vehicle and the drawn implement;

at least one sensor provided in operative association with the at least one drawbar-related component so as to detect a load applied through the at least one drawbar-related component; and a controller communicatively coupled to the at least one sensor, the controller including a processor and associated memory, the memory storing instructions that, when executed by the processor, configure the controller to:

monitor the load applied through the at least one drawbar-related component while the drawn implement is being transported by the work vehicle;

detect a variation in the monitored load over time;

compare the detected load variation in the monitored load to a predetermined load variance threshold; and control an operation of at least one of an implement suspension system of the drawn implement or a vehicle suspension system of the work vehicle so as to reduce the detected load variation in the monitored load when the load variation exceeds the predetermined load variance threshold, wherein the controller is configured to raise or lower a front axle of the work vehicle relative to a chassis of the work vehicle while simultaneously raising or lowering the ground-engaging tool relative to the driving surface as the drawn implement is being transported so as to reduce the detected load variation in the monitored load.

* * * * *